Jan. 31, 1956  D. N. MacDONALD  2,733,323
ROTARY SWITCH
Filed Nov. 5, 1952
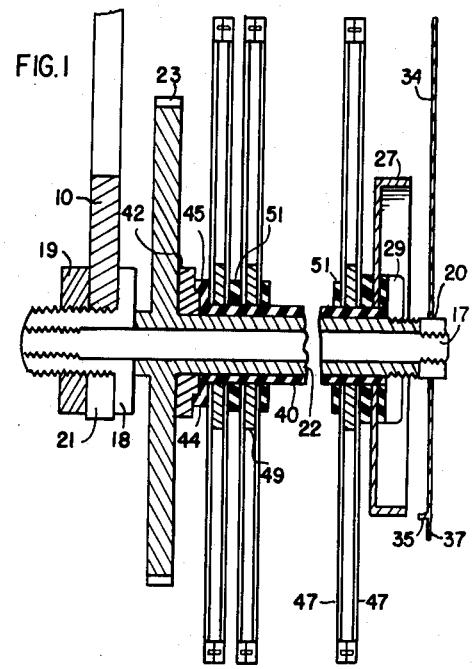
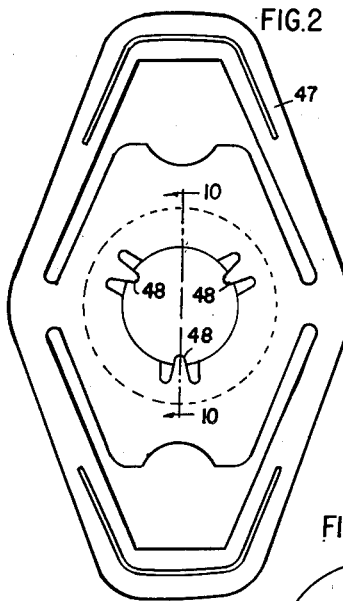
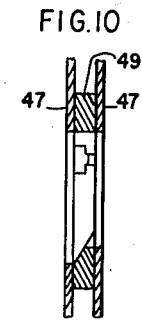
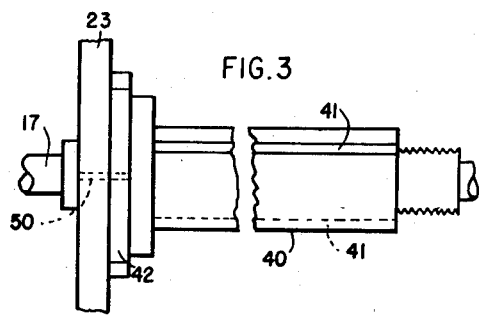
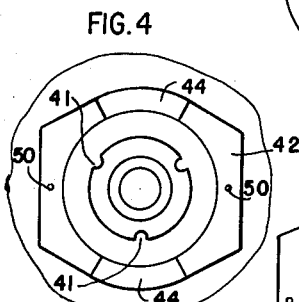
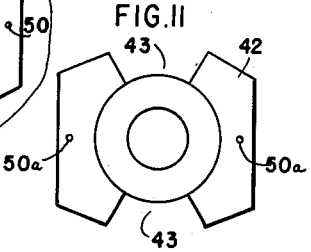
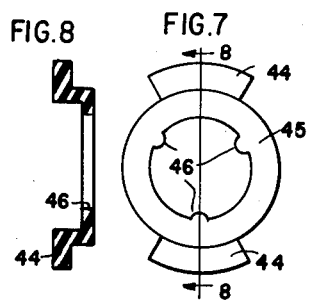
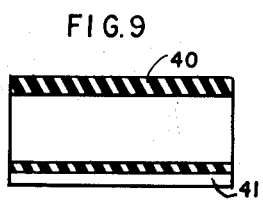
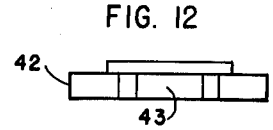
INVENTOR.
Duncan N. Mac Donald
BY *Wm Walter Owen*
Atty.

2,733,323

ROTARY SWITCH

Duncan N. MacDonald, Arcadia, Calif., assignor to Automatic Electric Laboratories, Inc., Chicago, Ill., a corporation of Delaware Application November 5, 1952, Serial No. 318,827

4 Claims. (Cl. 200—171)

The present invention relates in general to automatic switching apparatus but is particularly concerned with the production of a wiper assembly mounted upon a shaft for use in a rotary switch such as disclosed by U. S. Patent No. 2,522,715 granted to K. W. Graybill on September 19, 1950.

The principal feature of this invention is the provision of a positively aligned means for positively keying the wiper assembly together and insulating the same from the switch shaft.

In keeping with this object, a feature of this invention is the construction of such a wiper assembly as to provide a positive interlocking means including an insulating member so that the independent rotation of different parts is prevented. It comprises economically fabricated parts, easily assembled and yet accurate and efficient in operation.

Another feature of this invention is to provide a phenolic bushing which is interlocked with an insulating member. Three longitudinal grooves symmetrically disposed around the circumference of the insulating member are engaged on said bushing to lock said member and bushing. The wiper blades mounted on the insulating member also have prongs which extend into said grooves to prevent rotation of the wipers with respect to said member.

A further feature of this invention resides in that the prongs on the wipers are bent slightly to allow assembly onto the member while the washer between each pair of blades is hollowed out to allow the deflection of the prongs.

A still further feature of the invention is the design of the wiper blades as being roughly elliptical in shape so that the greatest possible length in a restricted space is obtained and symmetrical action in either direction of rotation is so provided without chatter.

For a more complete description of the shaft and the wiper assembly together with the operation thereof, reference will now be made to the accompanying drawings in which, Fig. 1 is a cross sectional view of the wiper assembly, switch shaft and ratchet wheel.

Fig. 2 is a front view of the wiper blade.

Fig. 3 shows view of the wiper shaft with wiper blades removed.

Fig. 4 is an end view of Fig. 3.

Fig. 5 is a top view of a steel washer.

Fig. 6 is a cross sectional view of the steel washer.

Fig. 7 is the top view of the phenolic bushing.

Fig. 8 is a cross sectional view along the lines 8—8 of Fig. 7.

Fig. 9 is a cross sectional view of the insulating member.

Fig. 10 is a cross sectional view along the lines 10—10 of Fig. 2.

Fig. 11 is the view of the metallic member with two cut out portions.

Fig. 12 is the side view of the metallic member of Fig. 11.

Referring now more in detail to the drawings; all parts of the wiper assembly are mounted upon a stationary spindle 17 which is threaded on both ends as shown in Fig. 1. The spindle is rigidly secured to the switch frame by means of flanged nut 18 and a nut 19. The nut 18 is threaded on the inside to receive spindle 17 and is threaded on the outside to receive nut 19, the latter being tightened down after the threaded stud end of the nut 18 has been inserted in a slot 21 in the switch frame and centered with respect to bank contacts (not shown). Mounted on the stationary spindle 17 is a rotatable hollow shaft 22 having integral therewith (or rigidly affixed thereto) a toothed ratchet wheel 23. Mounted on the shaft 22 is a cylindrical insulating member or sleeve 40 carrying three longitudinal grooves 41 symmetrically disposed around its circumference as shown in Figs. 3 and 4. A metallic member 42 which is firmly secured to the ratchet wheel 23 by means of pins 50 as shown in Figs. 3, 4 and 11 has a hole 50a on each side to receive pins 50 and two cut out portions 43 to suitably receive two key lugs 44 of a circular molded phenolic bushing 45 for the purpose of interlocking said metallic member to said bushing. As shown in Fig. 7, the two key lugs 44 are extended from the external circumference of the bushing 45. In the internal circumference of the bushing 45, three lugs 46 are projected and register with the grooves 41 of the insulating member 40 to interlock the bushing 45 to the insulating member 40 when the bushing is forced to the end of member 40 as also seen in Figs. 4 and 7.

Referring now to Fig. 2, the wiper blades 47 are elliptical in shape with three prongs 48 for projecting into the longitudinal grooves 41 to interlock the wiper blades 47 to the insulating member 40 so that the independent rotation of the blades with respect to the insulating member 40 can be prevented. The prongs 48 are all bent slightly in one direction to allow assembly onto the insulating member. Each pair of wipers 47 are rigidly secured by welding steel or the like to a washer 49 between each pair of blades as shown in Figs. 2 and 10, and each washer is hollowed out to allow the deflection of the prongs 48 as shown in Fig. 10. There is also an insulating washer 51 between every two pairs of wipers as shown in Fig. 1.

The assembly of the various parts on the rotatable shaft 22 having ratchet 23 rigid therewith, and with the keying member 42 rigidly secured to wheel 23, is accomplished by first placing the longitudinally grooved sleeve 40 over the right end of shaft 22. The interlocking bushing 44 is then forced over sleeve 40 with its inner projections 46 engaging in the three corresponding longitudinal grooves 41 and pushed along to the left until the projections 44 thereon fit tightly into the openings 43 in member 42. The sleeve 40 is now locked against rotation relative to shaft 22. The sets of wipers 47, each secured to a steel washer are now slid over the sleeve 40 from right to left with the bent over ends of lugs 48 dragging in each of the three grooves 41. It will be seen that these lugs tend to dig into grooves 41 when an attempt is made to move them in the opposite direction, namely left to right. The desired number of wiper sets 47 with insulating washers 51 between each set are now placed on the shaft. The indicating ring 27 with washers 51 on each side are placed thereon and nut 29 tightened on the threads of shaft 22 to clamp the whole rotating assembly together as a unit on shaft 22. This whole assembly is rotatable as a unit on shaft 17 between nuts 18 and 20. Unlike conventional keying arrangements, wherein a certain amount of play seems unavoidable, the present device, under no circumstances has any play between the wiper and the shaft. A considerable saving of space is also effected in addition to the provision of a positive interlocking key which prevents the independent rotation of various parts regardless of tolerance variations.

Having described the invention what I believe to be new and desire to have protected by Letters Patent is set forth in the following claims.

What is claimed is:

1. In an automatic switching apparatus, a plurality of wiper blades, an insulating member, a shaft supporting said insulating member, a phenolic bushing supported on said shaft, three longitudinal grooves in said insulating member, two key lugs on the external circumference of said phenolic bushing, and three lugs projected from the internal circumference of said bushing, a metallic member secured to said shaft, two cut out portions in said metallic member for suitably receiving said key lugs on said bushing to interlock said shaft and bushing, said three lugs cooperating with said grooves of said insulating member to further interlock said bushing to said insulating member, prongs on said wiper blades projecting into said grooves for locking said blades to said insulating member, whereby the wiper blades are locked to said shaft and are insulated from said shaft by said insulating member.

2. In a switching apparatus, a rotatable shaft, an element secured to said shaft having keying elements, an insulating sleeve surrounding said shaft and having longitudinal grooves therein, a key member having elements registering with the keying elements of said shaft and projections registering with said grooves, said key member when forced over said sleeve locking the sleeve against rotation relative said shaft by means of said elements and projections, a series of wipers each having center openings with prongs projecting therein, said prongs also registering with said grooves when the wipers are assembled on said sleeve to thereby prevent any relative movement of said wipers and sleeve, and means for securing said wipers, sleeve and shaft together as a rotatable unit.

3. In an automatic switching apparatus, a rotatable shaft, an insulating sleeve surrounding said shaft, a plurality of longitudinal grooves in the outer circumference of said sleeve, a plurality of flexible wiper blades having an inner circumference substantially the same as the outer circumference of said sleeve, a plurality of prongs extending inwardly from the inner circumference of said wiper blades, the depth of said grooves in said sleeve being less than the length of said prongs, said prongs being slightly bent in one direction and flexibly dragging in said grooves during assembly of said wiper blades in the opposite direction onto said sleeve, and said prongs tensioned to cut in and be imbedded into said grooves to prevent displacement of said wiper blades in said one direction after assembly to thereby lock said wiper blades to said sleeve.

4. In an automatic switching apparatus as claimed in claim 3 including a phenolic bushing supported on said shaft, means for locking said bushing to said shaft, said bushing having an inner circumference surrounding one end of said sleeve, and projections extending inwardly from the inner circumference of said bushing registering with said grooves in said sleeve to lock said bushing to said sleeve whereby said shaft, said bushing, said sleeve and said wiper blades constitute a rotatable unit.

References Cited in the file of this patent

UNITED STATES PATENTS

| 687,669 | Thomas | Nov. 26, 1901 |
| 1,077,746 | Peterson | Nov. 4, 1913 |
| 2,466,072 | Batcheller | Apr. 5, 1949 |

FOREIGN PATENTS

| 376,355 | Germany | May 28, 1923 |